United States Patent [19]

Fink

[11] Patent Number: 5,283,796
[45] Date of Patent: Feb. 1, 1994

[54] PHASE PLATE OR SPIRAL PHASE WHEEL DRIVEN LINEAR FREQUENCY CHIRPED LASER

[75] Inventor: David Fink, Los Angeles, Calif.

[73] Assignee: Hughes Aircraft Company, Los Angeles, Calif.

[21] Appl. No.: 871,888

[22] Filed: Apr. 21, 1992

[51] Int. Cl.$^5$ .............................................. H01S 3/13
[52] U.S. Cl. ........................................ 372/32; 372/19; 372/28; 372/98; 372/9
[58] Field of Search ........................ 372/18, 20, 19, 28, 372/92, 98, 99, 9

[56] References Cited

U.S. PATENT DOCUMENTS

| | | | |
|---|---|---|---|
| 4,088,898 | 5/1978 | Stitch | 372/28 |
| 4,314,210 | 2/1982 | Everett | 372/18 |
| 4,977,562 | 12/1990 | Welch et al. | 372/20 |

*Primary Examiner*—Léon Scott, Jr.
*Attorney, Agent, or Firm*—William J. Streeter; Wanda K. Denson-Low

[57] ABSTRACT

Frequency modulated radar transmitters with a repetitive linear increase in frequency with time, referred to as "frequency chirps", are required for many radar applications. The present invention provides a simple way of obtaining such a chirped frequency modulation for a laser radar transmitter or the like. The principle is to translate an optical wedge in the direction of its wedge gradient at constant velocity across the optical path of a laser resonator. The resulting increase or decrease in the effective optical length of the resonator causes frequency chips. In a first embodiment of the present invention, a rotating phase plate on the face of a rotating wheel with the added phase varying linearly with angular position around the wheel is placed within a laser's resonator cavity to tune the optical pathlength of the cavity and thereby the longitudinal mode of the resonator to produce the chirp. This embodiment can be used in either a reflective or a transmissive mode. In a second embodiment of the present invention, the outer peripheral rim of a spiral wheel having a spirally increasing or decreasing radius is used, whereby the rim functions as a mirror, is disposed within the laser resonator. Rotating the wheel changes the optical pathlength of the resonator and causes the longitudinal modes of the resonator to tune so as to generate the required chirp sequence. Lastly, various systems are proposed for eliminating various types of errors in the system as well as for generating both up-chirps and down-chirps sequentially and/or simultaneously.

19 Claims, 5 Drawing Sheets

PHASE PLATE OR SPIRAL PHASE WHEEL DRIVEN LINEAR FREQUENCY CHIRPED LASER

BACKGROUND OF THE INVENTION

1. Field of the Invention

The present invention relates generally to linear frequency chirped lasers, and more particularly to a linear frequency chirped laser that is either helical phase plate driven or spiral phase wheel driven.

2. Description of the Prior Art

The most common system used in the prior art to cause a laser to rapidly "chirp" uses an electro-optic crystal within the laser resonator. An increasing voltage applied to the crystal causes its index of refraction to change, changing the optical length of the resonator cavity and causing the resonator's longitudinal modes to tune. The specifics of such a prior art system will be discussed for waveguide $CO_2$ lasers.

The disadvantages and problems of the prior art include, but are not limited to, the following. The electro-optic crystals are typically cadmium telluride (CdTe) of 2 mm $\times$ 2 mm in cross-section and 5 cm long. The crystals must be polished on all surfaces, with the 2 mm $\times$ 2 mm ends being of optical quality and including anti-reflection coatings. The electro-optic crystals of cadmium telluride are very expensive and very fragile.

The electro-optic effect requires a ramp of 0 to 1600 volts across the 2 mm crystal width. The ramp must be very accurately linear, and it must be swept in, typically, 3 to 30 $\mu$sec. This is a very difficult requirement combining both high voltages and radio frequencies (RF). Furthermore, the crystal has an index of refraction of 2.7, so its optical length is 13.5 cm. This length, plus the length for the laser gain, requires that the free spectral range is limited to 500 MHz, and the laser cannot reach the chirp amplitude of 1 GHz desired for some applications without adding longitudinal mode suppression to an already very complex device. The present invention adds less than 2 cm to the optical length of the laser, so the laser can easily reach the 1 GHz chirp amplitude.

The electrode connections must be made between two of the 2 mm $\times$ 5 cm faces of the crystal, and the high voltage RF power must not arc to other parts of the crystal holder or flash-over from one electrode to the other.

Residual strain in the crystal or strain induced by the crystal holder causes transverse variation in the index of refraction, which will distort the optical beam and lead to optical loss within the resonator and a degraded beam quality of the laser output. The strain will also cause birefringence, which will convert one polarization of the light into the other. This will cause further optical distortions because the electro-optic effect is different for the different polarizations. It will also increase the optical losses because some of the optical components will be polarization selective (the spectral line-selecting diffraction grating, for example, and, possibly, the waveguide bore).

Electro-optic crystals are also piezo-electric, so the applied voltage ramp also causes a dimensional change. Because the voltage ramp occurs rapidly, a spectrum of acoustic waves are generated within the crystal. The acoustic energy will fracture the crystal if it is not removed. Even if attenuated enough so that fracture of the crystal will not occur, the acoustic energy will still induce dynamic strain-optic effects. Therefore, this energy must be removed to a very high degree of completeness.

The crystal also absorbs some optical power, which shows up as heat that must also be removed. The heat input is not uniform across the crystal, but is proportional to the optical intensity, which is most intense on the optical axis, farthest from the cooling walls. The absorbed power sets up a temperature gradient within the crystal, which causes index of refraction gradients and mechanical strains, which in turn cause strain-optic effects. These effects limit the circulating optical power and the achievable laser power and beam quality.

The electro-optic crystal must be aligned with the waveguide bore to within very exacting tolerances in both offset and angle, or the insertion losses of the modulator become very large and the optical quality of the laser output drops. This requires a precision adjustable crystal holder and a difficult alignment procedure. The crystal holder must also absorb the acoustic energy, route the high voltage RF, and provide the cooling, all without straining the crystal. The very best electro-optic modulators should have insertion losses of about 6% round-trip, and more typically they are about 10%. The present invention has an insertion loss of less than 1% round-trip.

The chirp linearity and repeatability limit the resolution of a radar system using a chirped laser transmitter. The linearity of the electro-optic driven chirp depends mainly on the linearity of the voltage ramp with time and the piezo-electric/strain optic dynamic disturbances in the index of refraction. Other effects such as the thermal and strain-induced index of refraction gradients and birefringence will also contribute to non-linearities in the resulting optical frequency chirp. Similarly, the repeatability of the chirp slope depends not only on the repeatability of the voltage drive, but also on the dynamic strain-optic effects and the temperature dependence of the electro-optic coefficient. The prior art systems can keep deviations from linearity of the chirp ramp to 1% of the chirp amplitude, and the value of the chirp slope can be maintained constant to approximately 1% from chirp-to-chirp. The present invention very significantly improves these numbers by at least a factor of 100! The system of the present invention solves substantially all of the problems of the prior art while avoiding its shortcomings.

BRIEF SUMMARY OF THE INVENTION

A frequency modulated radar transmitter with a repetitive linear increase in frequency with time (called a "frequency chirp") is required for many radar applications. This invention provides a very simple way of obtaining such a "chirped" frequency modulation for laser radar transmitters. The system of the present invention can generate wider, faster, more linear, and more repeatable chirps than the prior art, and therefore radars made utilizing the concept of the present invention will have higher resolution. The present invention can do this with lower laser internal losses and therefore significantly higher laser output power and better beam quality. The present system is also significantly cheaper to build, easier to maintain, and less prone to failures.

In one example, a high performance laser radar requires that the chirp be made using a 1 GHz frequency ramp in 3 $\mu$sec. Some applications can use lesser requirements of 100 MHz in 30 $\mu$sec. The present invention can far exceed even the high performance requirement set forth above.

The simplest implementation of this invention is to use a laser resonator with a prism as part of the optical path and translate the prism in the direction of its thickness gradient. This will change the effective optical path length within the laser resonator and cause the frequency of the laser to change. An analogous action can be performed with a reflective wedge as part of the laser optical path. The invention works for both ring resonators and the more common non-ring resonators.

One embodiment of the present invention uses a helical phase plate on a rotating wheel within a laser resonator cavity to tune the optical length and thereby the longitudinal modes of the resonator. In a second embodiment, the system of the present invention utilizes the rim of a spiral wheel having a spirally increasing radius with a mirror finish placed inside the laser resonator. Spinning or rotating the wheel causes the optical length of the resonator to change thereby causing the longitudinal modes of the resonator to tune. The spiral shape of the mirror introduces some optical distortion, but the correction required to compensate for the spiral is mainly cylindrical and can be easily achieved with a conventional cylindrical lens. The lasers of the present system can provide extremely high resolution, range, rate, and imaging.

These and other objects and advantages of the present invention will be more fully understood after reading the detailed description of the preferred embodiments, the claims, and the drawings, which are briefly described hereinbelow.

DETAILED DESCRIPTION OF THE PREFERRED EMBODIMENTS

This application is closely related to my copending application entitled "Diffraction Grating Driven Linear Frequency Chirped Laser," filed on even date with this application and assigned to the same assignee, the disclosure of which is incorporated herein. A frequency modulated radar transmitter having a repetitive linear increase in frequency with time (called a frequency chirp) is required for many radar applications. The present invention provides a very simple way of obtaining a chirped frequency modulation for laser radar transmitters. This invention can generate wider, faster, more linear, and more repeatable chirps than any prior art system, and therefore radars made using the system of the present invention will have higher resolution. The present invention can do this with lower laser internal losses, significantly higher laser output power, and better beam quality than the prior art. The present invention is also significantly cheaper to build, easier to maintain, and less prone to failure. For example, a high performance chirp would be a 1 GHz frequency ramp in 3 $\mu$sec. Some applications can use lesser requirements of 100 MHz in 30 $\mu$sec. The system of the present invention however, can far exceed even the high performance requirements.

Figure 1:
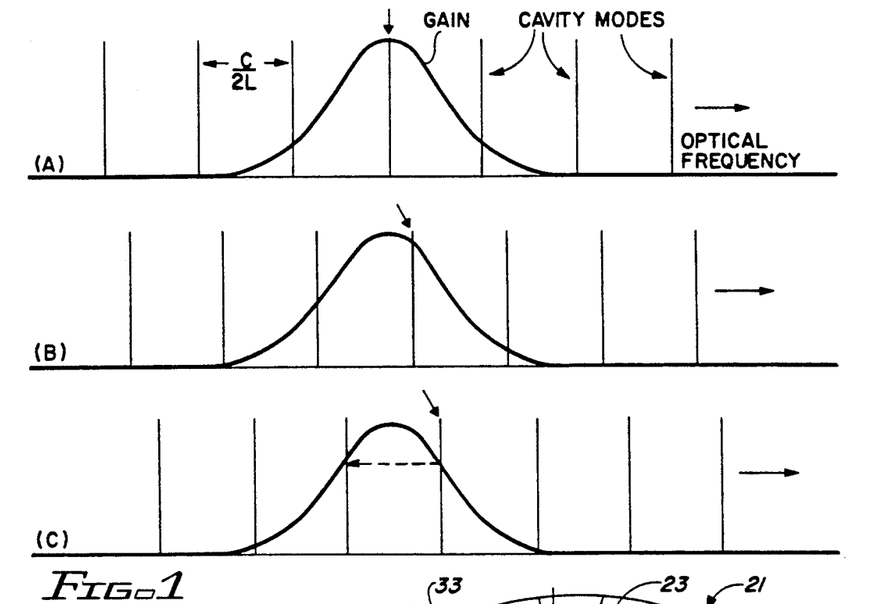
FIGS. 1A, 1B, and 1C are graphic illustrations representing the tuning of the longitudinal modes of the laser to repetitively sweep out one Free Spectral Range (FSR).

A laser resonator can operate at any of its longitudinal mode frequencies. Which mode will lase is determined by the gain of the medium. The longitudinal mode at the frequency with the highest gain will lase (for homogeneously broadened gain media as in the $CO_2$ waveguide laser). By moving an end mirror of the resonator or otherwise changing the optical path length of the resonator, the longitudinal modes will tune, and so will the operating frequency of the laser. The laser frequency will follow the longitudinal mode until another longitudinal mode is closer to the gain line center and therefore has a higher gain. The laser will then change to this higher gain longitudinal mode. The tuning range available, called the free spectral range (FSR), is the frequency separation between longitudinal modes and is given by the formula $FSR = c/2L$, where "c" is the velocity of light and "L" is the resonator optical length. The FSR is 1 GHz for a 15 cm resonator optical length. The FSR will be swept every time the resonator optical length changes by ½ wavelength. This process is shown in the waveform diagrams of FIGS. 1A, 1B, and 1C. The tuning can be done at essentially any rate because the Doppler shift off of the moving mirror exactly matches the frequency shift of the tuning longitudinal modes, or equivalently, the element changing the optical length changes the frequency of the light within itself so the emerging light exactly matches the frequency of the tuning longitudinal mode.

The simplest implementation of this invention is to use a laser resonator with a prism as part of the optical path and translate the prism in the direction of its thickness gradient. This will change the optical path within the laser resonator and cause the frequency of the laser to change. An analogous action can be performed with a reflective wedge as part of the laser optical path. The prism method has a major feature of not being sensitive to misalignments of the prism as it is moved, as the deviation of a prism is a weak function of the orientation of the prism. Use of a simple prism or simple wedge does have the disadvantage of eventually moving the available length of the element and having to reverse the motion, however, that is acceptable in many applications. For example, consider a germanium prism 50 mm long with an increase in thickness of 5 mm. At the $CO_2$ laser wavelength of 10.6 $\mu$m, the index of refraction of germanium is 4.0, so the optical path through this prism will increase by 15 mm or 1,415 wavelengths as the prism is moved within the laser, which will cause the laser to tune over 2,830 FSRs. The requirement for reversing the motion after exhausting the available length of the prism or wedge can be eliminated by "wrapping" the prism or wedge onto the surface of a wheel. The details of such wrapping is discussed next.

In one embodiment of the present invention, a system is described that uses a rotating phase plate within a laser resonator cavity to tune the optical length and thereby the longitudinal modes of the resonator. In a second embodiment, the invention uses the outer peripheral rim of a wheel having a spirally increasing radius used as a mirror disposed or positioned inside the laser resonator. Spinning or rotating the wheel changes the optical length of the resonator and causes the longitudinal modes of the resonator to tune. The spiral shape of the mirror introduces some optical distortions, but the correction required to compensate for the spiral is mainly cylindrical and can be easily accomplished using a cylindrical lens.

The first embodiment of the present invention uses a helical phase plate wheel whose thickness increases linearly with the angular location about the wheel. The optical beam is transmitted through this variable thickness portion (transmissive mode) or reflected off of it (reflective mode), and the phase plate wheel is spun or rotated to vary the length of the optical path. For mechanical dynamic balancing purposes, the wheel should have at least two cycles or repetitions of wedges or ramps of increasing (or decreasing) thickness.

Figure 2:
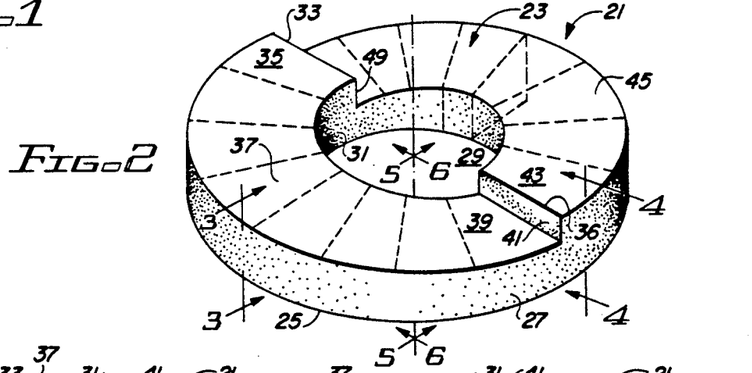
FIG. 2 is a perspective view of a helical phase plate used in a first embodiment of the present invention.

Such a helical phase plate wheel is shown in FIG. 2. Note that any energy absorbed by the wheel is distributed over the entire circumference of the wheel and not concentrated on just the area of the beam spot. The phase plate wheel 21 of FIG. 2 introduces a distortion into the optical beam because the wedge is in a tangential direction, which is a different direction for different parts of the beam spot on the plate. However, this is only a static distortion and can be corrected with a conventional fixed corrector plate. The magnitude of the distortion depends on the beam spot size, its distance to the center of the wheel, and the phase wedge of the wheel.

In FIG. 2, the phase plate wheel 21 is shown as having a top or upper surface 23, a bottom or lower surface 25, and an outer peripheral edge 27. The bottom surface 25 is normally planar while the upper surface 23 contains the helical wedges or ramps, as hereinafter described. The wheel 21 of FIG. 2 is shown as being annular and includes an annular central or axial opening 29 surrounded by an annular wall portion 31. The upper surface 23 of the helical phase plate 21 is shown as having an upper edge 33 where the highest thickness or height portion 35 of the downwardly-sloping optical wedge surface 37 begins. The lowest surface thickness or height portion 39 of the downwardly-sloping helical ramp 37 is disposed proximate the bottom edge of a generally vertical abutment 41 whose top edge 36 starts the highest portion 43 of a second downwardly-sloping wedge or ramp surface 45 which terminates in a lowest surface portion 47 adjacent the bottom edge of the abutment surface 49. In this manner, two downwardly-helical optical wedges or ramps (or, alternatively, upwardly-helical optical wedges or ramps) are provided for varying the wedge thickness as the wheel is rotated about its axis to linearly change or vary the optical path with time.

Figure 3:
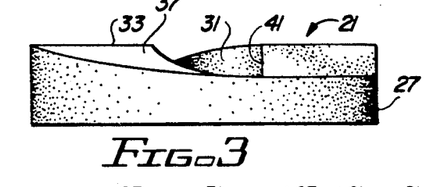
FIG. 3 is a side view of the phase plate of FIG. 2 taken along view lines 3—3 thereof.
Figure 4:
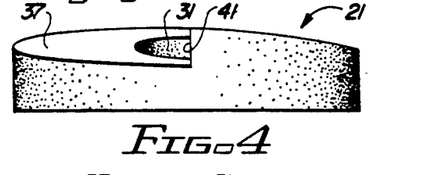
FIG. 4 is a side view taken along view lines 4—4 of FIG. 2.
Figure 5:
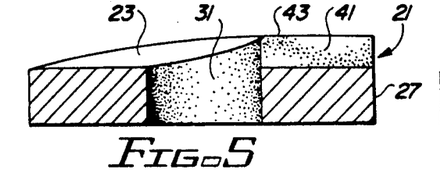
FIG. 5 is a sectional side view of the phase plate of FIG. 2 taken along view lines 5—5 thereof.
Figure 6:
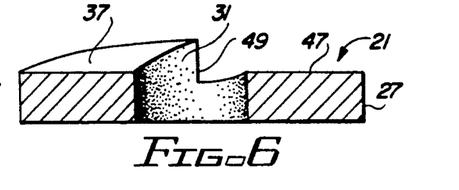
FIG. 6 is a sectional side view of the phase plate of FIG. 2 taken along view lines 6—6 thereof.

FIGS. 3 and 4 show two different side views of the phase plate 21 of FIG. 2, while FIGS. 5 and 6 illustrate two different sectional side views of the phase plate 21 of FIG. 2.

Figure 7:
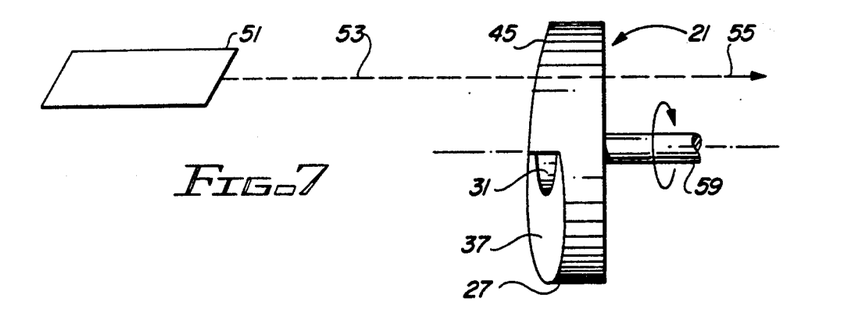
FIG. 7 is a schematic illustration of the implementation of the phase plate of FIG. 2 in a transmissive mode.

FIG. 7 shows a laser beam 53 (for example, a $CO_2$ laser beam) at 10.6 $\mu$m wavelength and a phase wheel 21, at least the ramps of which are made of germanium, which has an index of refraction of 4.0. If the wheel 21 is 5 cm in diameter and the ramp thickness increases by 2 mm over half a rotation, the phase plate will add 566 wavelengths in half a revolution of the wheel 21. The static distortion introduced by the phase wheel 21 can be corrected by a conventional fixed corrector and amounts to about one half of a wavelength over a 2 mm spot size. This same performance can be obtained for a reflective phase wheel if the ramp thickness grows by a 3 mm over half a rotation of the wheel.

In FIGS. 7 to 13, 17, and 18, the block designated by referenced numeral "51" will be referred to as a "laser" for the sake of brevity. However, it will be recognized by those skilled in the art that the block so designated actually represents the gain media of the "laser" In fact, the "laser" includes the output mirror, the corrective optics, the resonator cavity, the end-reflector or end diffraction grating, and anything in the resonant cavity. As used herein, the term "laser" shall mean any and all portions of a laser not otherwise shown.

Figure 8:
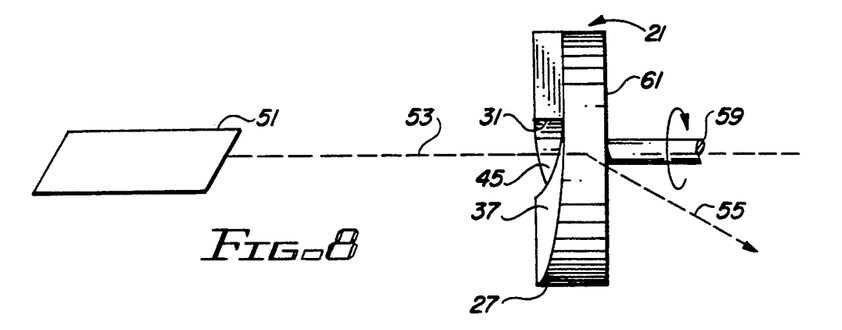
FIG. 8 is a top view of the implementation of FIG. 7.

FIG. 7 shows a source of an optical beam, such as a laser 51, emitting an optical beam 53 that is transmitted through the phase plate 27 as it rotates about axis or shaft 59 of the wheel 21 as transmitted beam 55. The transmitted beam 55 is deviated in the direction of the wedge of the plate, but because the wedge is in a tangential direction and not in a radial direction, from a front view, the deviation is in front of the paper and so it looks undeviated from the front. From the top view, as shown in FIG. 8, the deviation can be plainly seen in the transmitted beam 55.

Figure 9:
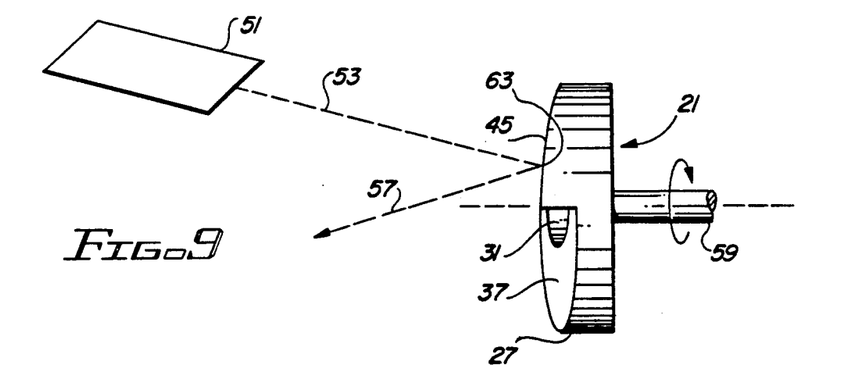
FIG. 9 is a schematic illustration of a helical phase plate used in a reflective mode.

FIG. 9 shows a laser 51 emitting a beam 53 that is reflected at a point of impingement 63 off of the mirrored surface of the ramp 45 of the phase wheel 21 as a reflected beam 57. Again, as the wheel 21 is rotated about the shaft 59, the length of the optical path changes continuously in a linear manner with time.

Figure 10:
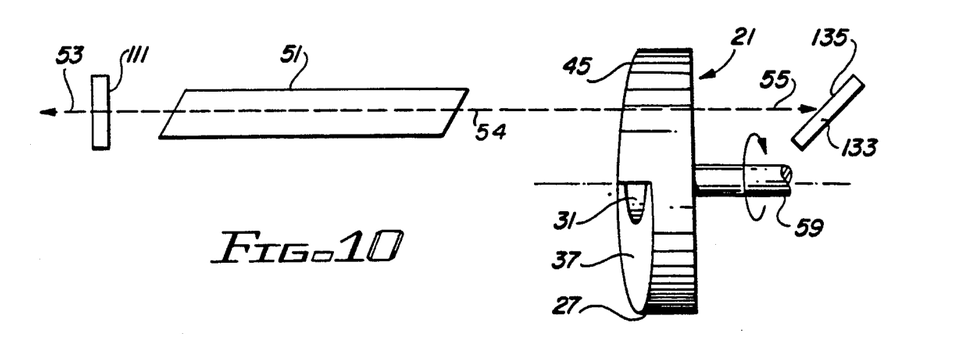
FIG. 10 is a schematic illustration of a chirped resonator incorporating a helical phase plate used in the transmissive mode.
Figure 11:
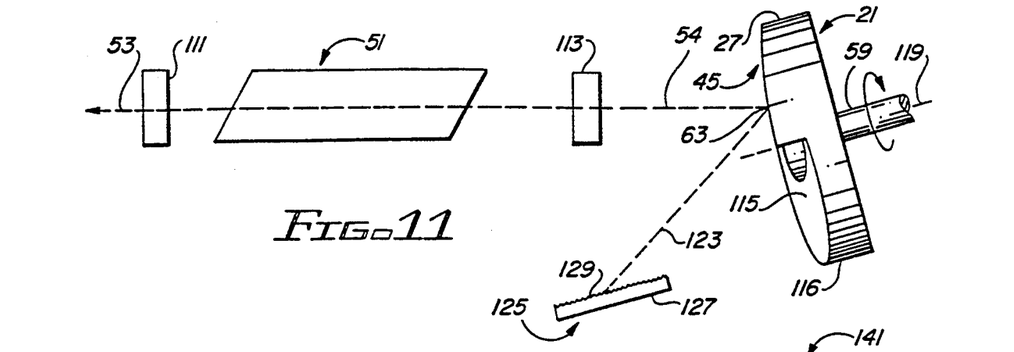
FIG. 11 is a schematic illustration of a chirped resonator incorporating a helical phase plate used in the reflective mode.

In the first embodiment of the present invention, a phase plate whose thickness increases linearly with angular location around the wheel is used. Such as optical phase plate is shown and described earlier with respect to FIGS. 2 to 9. The phase plate 21 is placed so the variable thickness portion 27 is part of the laser resonator, and then the plate 21 is spun or rotated to tune the optical length of the resonator. A laser resonator utilizing such a phase plate to produce a chirp is shown in FIGS. 10 and 11. Note that any energy absorbed by the phase plate is distributed over the entire circumference of the phase wheel, and not concentrated on just the beam spot size. The phase plate of the present invention can be used in either a reflective mode (FIG. 11) or a transmissive mode (FIG. 10) of operation. In the reflective mode of operation, a phase plate could serve as the end mirror of the resonant cavity of the laser. As previously described, the phase plate 21 introduces a distortion into the beam because the wedge is in the tangential direction, which is different for different parts of the beam spot on the plate. However, since this is a static distortion, it can be corrected easily with a fixed corrector plate. The magnitude of the error depends on the beam spot size, the distance of the beam spot from the axis of the wheel, and the phase wedge of the wheel.

FIG. 10 shows a laser medium 51 generating an output beam 53 through an output mirror 111. The beam 53 impinges on the face of the phase plate 21 as beam 54 and passes through the phase wheel 21 so that the transmitted beam 55 impinges and terminates on the front surface 135 of a diffraction grating or end mirror 133. As the phase wheel 21 rotates about the axis of the shaft 59, variation in the thickness of the wedge or the ramp 37 and 45 on the face of the plate 21 causes a change in the length of the optical path and thus produces the modulation of the frequency, which is required to produce a "chirp". This figure shows an embodiment wherein the phase wheel 21 is operated in a transmissive mode, rather than in a reflective mode, since the optical beam is actually transmitted through or passed through the material 27 of the phase wheel 21. The material may be, for example, germanium.

As a specific example, consider a $CO_2$ laser operating at 10.6 μm wavelength and a transmission phase wheel of germanium, which has an index of refraction of 4.0. If the phase wheel is 5 cm in diameter and the thickness increases by 2 mm over half a revolution, the resonator will go through 1132 FSRs in ½ of a revolution of the phase wheel. If the wheel is rotated at 110 Hz or 6600 rpm, each FSR will be swept in 4 μsec. (For comparison, recall that almost any automobile engine can rev at 6600 rpm.) The phase wheel would add less than 2 cm to the optical pathlength of the laser resonator compared to 14 cm of optical length that would be required with the electro-optic modulator of the prior art. Therefore, the chirp could be a full 1 GHz and could actually be swept in less than 4 μsec, depending on the rotational speed and rate of change of thickness of the wheel. The static distortion introduced by the phase wheel, as previously described, could be corrected by a fixed corrector plate and amounts to about ¼ wavelength over a 2 mm beam spot size.

Some frequency modulated radar systems require unidirectional chirps while others require both up-chirps and down-chirps. The prior art electro-optic devices favor the bidirectional chirps because the electro-optic voltage must be brought back the starting value, and unidirectional chirps require very fast reset times on the order of 10 nsec to bring the voltage back down from 1600 volts to zero. The current invention favors unidirectional chirps. However, in many situations that require bidirectional chirps, it is not necessary that the up-chirps and down-chirps alternate chirp-by-chirp. It is acceptable to alternate a sequence of up-chirps with a series of down-chirps, as long as the alternation frequency is fast enough, such as 5 msec of up-chirps followed by 5 msec of down-chirps, with 0.1 msec in between for switching.

Such alternation could be accomplished by using two counter-rotating phase plates, one behind the other. The front phase plate requiring slots, if used in a reflective mode, or non-wedged regions, if used in a transmissive mode. The back or rear counter-rotating phase plate would also require slots or non-wedged regions if used in a transmissive mode. The rotations would be synchronized so that only one phase plate is chirping the laser at any given time. The wedge or ramp angles on the face of the phase plate are identical for both plates and in the same direction so that their prism deviations will be in the same direction, and one corrector plate will compensate for both of their distortions.

Still another method of alternating the chirp direction is to make a single phase plate with both an increasing and a decreasing thickness portion. Here allowance must be made for the prism angle deviation introduced by the phase wheel. Since the thickness of the plate increases in the tangential direction, the plate has a prism deviation in the direction of the increasing thickness, given approximately by the formula $a(n-1)$ where "a" is the physical wedge angle and "n" is the index of refraction of the phase plate. Using the 5 cm germanium wheel example above, the plate thickness increases by 2 mm in half the circumference of the wheel of 7.9 cm, the physical wedge angle is 25 mrad, the optical deviation is 75 mrad, and the difference between the deviations of the up-chirps and the down-chirps beams is 150 mrad. If the additional resonator length can be tolerated, these beams can just be allowed to propagate until they are physically separated, and then one end mirror (or diffraction grating) can be supplied for each. For a waveguide laser with a 2 mm diameter beam, they will separate in 2 cm. The distortion correction plate required by the two beams are different, so they would have to be put in the separated portions of the beam path.

FIG. 11 shows a laser 51 having a laser output beam 53 passing through an output mirror 111. The laser beam 53 also passes through the corrector plate 113 as beam 54 for removing or eliminating any errors due to the distortion introduced into the beam because of the tangential direction of the wedge. The beam 54 is reflected off of the mirrored face 45 of a phase wheel 21 having a body 27, an outer peripheral edge 116, a shaft 59, and an axis of rotation 119. The mirrored surface 45 of the phase plate wheel 21 reflects the incoming beam 54 from the point of incidence 63, and the reflected beam is designated by reference 123, which then terminates on the diffraction grating element 125 having a body 127 and a surface 129 having a diffraction grating disposed thereon.

As the wheel 21 rotates about the axis of rotation 119, the linear ramp operably disposed on the front face 115 of the phase wheel 21 changes the length of the optical path of the resonant cavity, thereby tuning the longitudinal modes of the resonator. This amounts to a frequency modulation of the laser, and since it represents a repetitive linear increase or decrease in frequency with time, it is referred to as a "frequency chirp", as utilized in frequency modulated radar transmitters. Note that a reflective device used within the resonator cavity but not as an end-reflector gives twice the optical path change of an end-reflector because it is used twice on a resonator round-trip.

Figures 12, 13, 18:
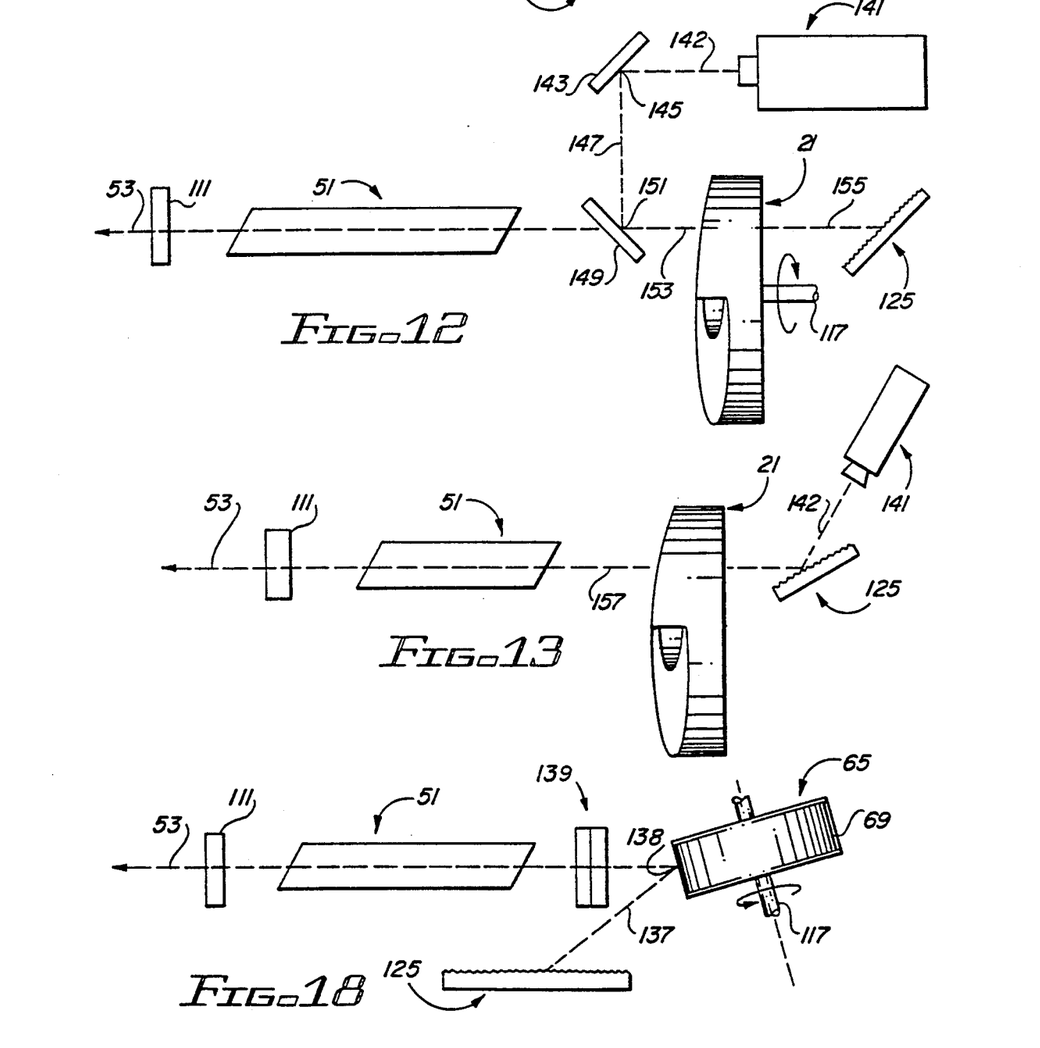
FIG. 12 is a schematic representation and configuration for starting the main laser up rapidly and at the same frequency on every chirp by use of a seed laser.
FIG. 13 is a schematic representation of an alternate embodiment to the system of FIG. 12.
FIG. 18 is a schematic illustration of a chirped resonator incorporating a spiral phase wheel.

As each chirp ends and the next starts, the laser mode at the frequency of the end of the chirp actually extinguishes and the mode at the frequency of the beginning of the next chirp starts. All laser modes normally start up from random noise, with the cavity losses discriminating against all except the noise that matches the laser mode. For chirps of very short duration, there might be a problem of establishing the new mode rapidly enough. To eliminate this problem, FIGS. 12 and 13 are presented, which show the chirping laser being injected with a seed by a seed laser. The seed laser is tuned to the desired chirp start frequency, so the chirp can start up from a fairly high level signal, instead of having to start from noise. In FIG. 13, the seed is injected via the zeroth order of the spectral line selecting diffraction grating. If a diffraction grating is not used, the seed can be injected via the scatter off one of the optics in the laser, or it can be injected through a beam splitter, as in FIG. 12.

FIG. 12 shows a seed laser 141 outputting a beam 142, which reflects off of a point of impingement 145 on the face of a mirror 143, and the reflected beam 147 impinges at the point of incidence 151 on a beam splitter 149. The reflected beam 153 goes back through the material or body of the rotating phase plate 21 to impinge as the transmitted beam 155 on the surface of a diffraction grating 125. The beam splitter 149 also passes the beam 53 generated by the laser 51, which is outputted through the output mirror 111.

FIG. 13 shows a laser 51 passing an output beam 53 through an output mirror 111. The beam 53 passes through a portion of the phase plate wheel 21, and a seed laser 141 transmits a beam 142 off of the face of a diffraction grating 125 and through the body of the material of the rotating phase plate 21 to form the combined beam 157 between the face of the phase plate 21 and the laser 51.

Figure 14:
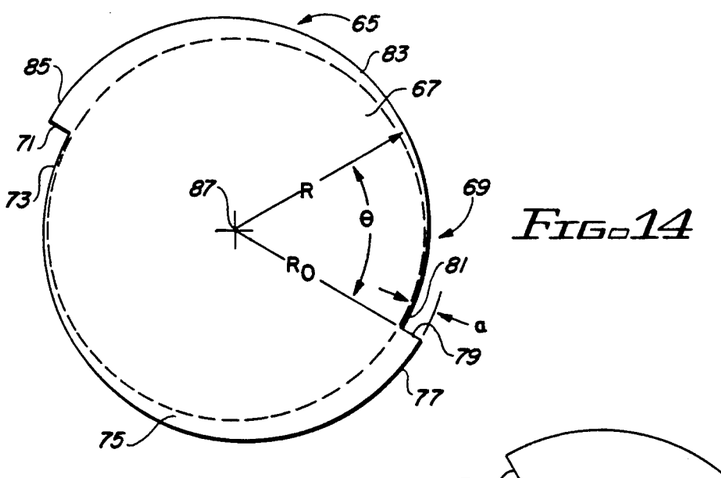
FIG. 14 is a schematic illustration of a spiral phase wheel frequency shifter used in a second embodiment of the present invention.

The second embodiment of the present invention employs a spiral wheel 65, illustrated in FIG. 14, having a body 67 and an outer peripheral rim surface 69. A generally vertical radial abutment 71 begins spiral path 75 of increasing thickness or radius at a low portion 73, and the spiraling path terminates at a high end portion 77 at a second radial abutment surface 79. A second path of increasing radius represented by the spirally increasing surface 83 begins at a low height or radius 81 adjacent the bottom edge of the abutment surface 79 and terminates in a high surface portion 85 adjacent the top edge of the opposite abutment surface 71. The spiral phase wheel 65 of FIG. 14 has an axis or center of rotation 87 and shows an angle $\theta$ where the initial or shortest radius is given by Ro and the ever increasing radius is given by the formula $R=R_0+(a/\pi)\theta$, where "a" is the height of the abutment surface 79 or 71 between the low surface and high surface 81, 77 and 73, 85, respectively.

Figure 15:
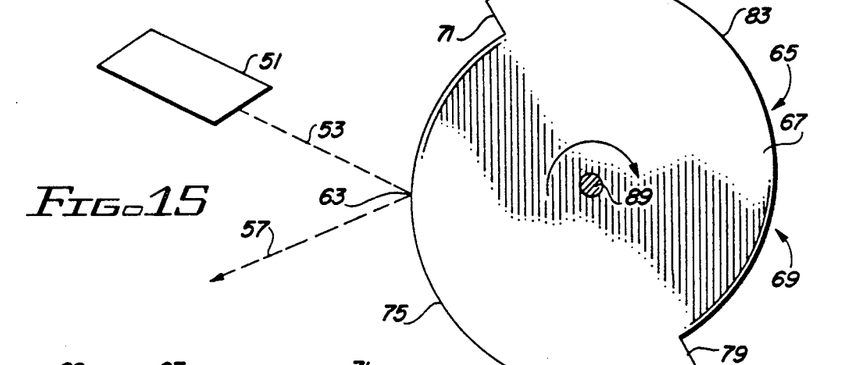
FIG. 15 is a schematic illustration of the spiral phase wheel of FIG. 14 used in the reflective mode.

FIG. 15 shows a laser 51 emitting a coherent beam of light 53 that impinges on a spot 63 on the radially spiraling mirrored surface 75 to produce a reflected beam 57. The radial phase wheel 65 is shown as being rotated in the clockwise direction about the axis 89.

As previous described, the second embodiment of the invention employs the spiral phase wheel 65 of FIG. 14 and uses the outer peripheral rim 69 of the wheel with a spirally increasing or decreasing radius as an optical mirror. Uniformly spinning the wheel about its axis 89 linearly increases or decreases the optical pathlength of the optical beam with time. The optical correction required to compensate for the spiral distortion described below is mainly cylindrical and can be easily done using a conventional cylindrical lens. For mechanical dynamic balancing purposes, the wheel should have at least two cycles of spirals on its peripheral rim. Any energy absorbed by the wheel is distributed over the whole circumference of the wheel and not concentrated on just the area of the beam spot. While the preferred embodiment of the spiral phase wheel of the present invention is for use in a reflective mode, it is also possible, with some possible difficulty in implementation, to use it in a transmissive mode, where the spiral rim wedge or layer is transparent.

The spiral wheel rim 69 acts as a cylindrical mirror, but some higher order distortions exist because the spiral does not have a constant radius of curvature. The cylindrical component of the distortion can be removed with a conventional cylindrical lens. Spinning the spiral wheel about its axis introduces dynamic (time-dependent) tilt, focus, and higher order distortions into the beam as different portions of the optical wedge of the spiral rim are brought into use. The average focus and distortion is a static effect and can be removed with a conventional fixed corrector plate, which can be part of the cylindrical lens system. The higher than focus distortions will generally be negligible, so usually there will be no need for a corrector plate, just the corrective cylindrical lens. The dynamic residuals and the dynamic tilt can be reduced to a negligible amount by increasing the radius of the wheel and decreasing the spiral amplitude. Decreasing the spiral amplitude reduces the rate of increase of optical path, but this can be recovered while still discriminating against the dynamic shift by using multiple reflections off of the spiral wheel, because the dynamic tilt varies as the square of the spiral amplitude while the rate of path change is proportional to the spiral amplitude itself.

Figure 16:
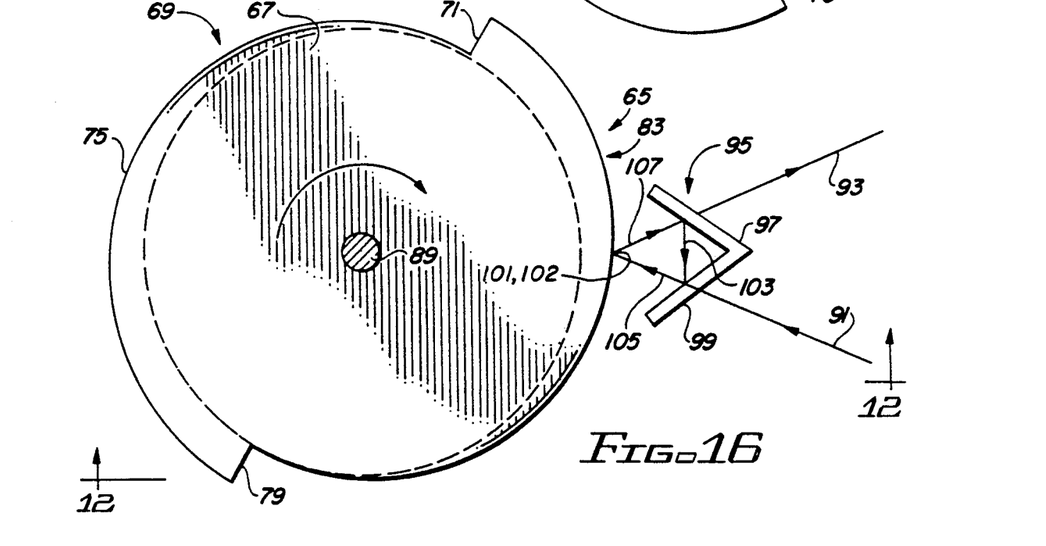
FIG. 16 is a schematic illustration of the spiral phase wheel of FIG. 14 used in the reflective mode with a means for cancelling out dynamic tilt.
Figure 17:
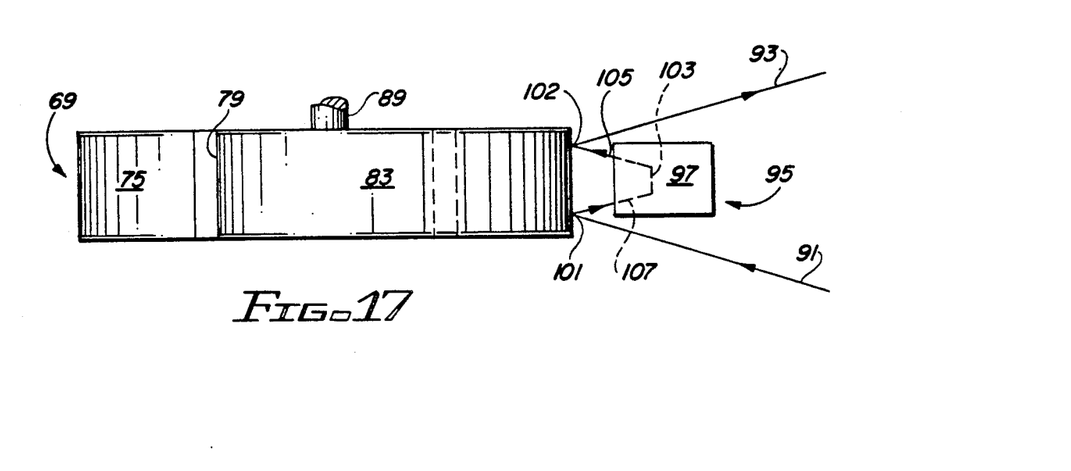
FIG. 17 is a top view of the spiral phase wheel and dynamic tilt cancellation means of FIG. 16.

The best way to use two reflections is with the beam flipped top-to-bottom between reflections so the dynamic tilt will exactly cancel. The flip can be done by the set-up or configuration shown in FIGS. 16 and 17. In FIG. 16, the spiral wheel 65 is shown as being rotated in a clockwise direction about axis 89. An impinging beam of light 91 passes by one plate 99 of a conventional beam-flipping configuration 95 having a second plate 97. After passing the plate 99, the beam 91 impinges off of spot 101 on the mirrored rim of the spiraled ramp 83 and is reflected back as beam 107. Beam 107 bounces back off of the roof as beam 103. Beam 103 bounces off of the other plane and back to the rim surface as beam 105. Beam 105 then reflects off of the rim surface at point 102 to bypass the plates and become the compensated reflected beam 93. FIG. 17 presents a top view of the system of FIG. 16 and better illustrates the flip compensation system. In FIG. 17, the impinging beam 91 is shown as being reflected off of the mirrored rim surface 83 at a point of impingement 101. The reflected beam 107 then enters the beam-flipping mirrors 97, 99 and bounces between them as beam 103. From there, the beam is reflected back as beam 105 to impinge on the surface 83 at a point of impingement 102. The beam is then reflected therefrom as the exiting beam 93.

The roof reflection in FIGS. 16 and 17 has a less than 90° angle so that the two spots of beam impingement on the wheel can be at the same angular location on the wheel. Both beam spots are then interrupted by the spiral breaks or abutments at the same time. Dynamic focus and higher components can be reduced in exchange for some dynamic tilt and more spiral break interruptions by off-setting the angular locations of the two spots of beam impingement such that the first reflection is at the start of the spiral when the second is half-way up, and the first is half-way up when the second is at the top. The offset can be done either mechanically with two spiral wheels locked together with a fixed angular offset or optically by having the two reflections at different locations on one spiral wheel.

FIGS. 16 and 17 may, for example, represent a specific example where the optical beam is at 10.6 $\mu$m wavelength and a double pass spiral phase wheel 10 cm in diameter with an increase in radius of 2 mm over half a rotation is used. The optical pathlength will increase by 8 mm or 750 wavelengths in a half revolution of the wheel. The dynamic tilt, cancelled by the flip, is about $\pm 0.25$ mrad per wheel reflection. The dynamic focus amounts to $\pm 1/25$ wavelength per reflection for a 2 mm diameter optical beam, for a dynamic distortion of only $\pm 1/12$ wavelength.

In the second embodiment of the present invention, the spiral outer peripheral rim of the wheel is used as a mirror and is disposed within the laser resonator. Then the wheel is spun or rotated about its axis to tune the resonator's optical path length and cause the longitudinal modes of the resonator to tune. Such a wheel is shown and described in FIGS. 14 to 17 and a resonator cavity including a spiral wheel is shown in FIG. 18. The spiral wheel can be used as an end mirror, but by using it as an internal mirror as in FIG. 18, it is used twice per cavity round-trip, thus doubling its effects.

FIG. 18 shows the laser 51 generating an output beam 53 passing through an output mirror 111. The beam 53 also passes through a corrective lens or plate 139 and impinges at point 138 on the spiraled outer peripheral mirror surface 69 of the spiral wheel 65, which is rotating about the rotational axis of the shaft 117. The optical beam is reflected from the outer peripheral mirrored ramp or spiraled surface 69 of the rotating spiral wheel 65, and the reflected beam 137 impinges onto the diffraction grating 125. As the optical pathlength is changed with the variance in the thickness of the spiral wedge on the outer peripheral surface 69 of the spiral wheel 65, the laser frequency is modulated to produce the required chirp.

Note that any energy absorbed by the wheel, as with the first embodiment, is distributed over the entire circumference of the wheel and is not concentrated on just the beam spot size. It would be possible to make such a spiral phase wheel work in a transmissive mode where the spiral rim surface is transparent, but this is somewhat more difficult than the spiral wheel in the reflective mode.

The wheel rim acts as a cylindrical mirror plus some small higher order distortions that exist because the spiral does not have a constant radius of curvature. Static and dynamic distortion, the use of reflections, and a numerical example of the magnitude of the effects were discussed previously herein.

To consider a specific example, assume a $CO_2$ laser operating at 10.6 $\mu$m wavelength and a spiral phase wheel 10 cm in diameter with an increase in radius of 2 mm over one-half of a rotation or revolution. The optical path difference per reflection is twice the spiral amplitude, so if the wheel is not the end-reflector, as in FIG. 18, the resonator will go through 750 FSRs in a half revolution of the wheel. If the wheel is rotated at 110 Hz or 6600 rpm, each FSR will be swept in 6 $\mu$sec. The wheel would add less than 2 cm to the resonator optical length, compared to 14 cm of optical length for the electro-optic modulator, so the resulting chirp could be a full 1 GHz and could actually be swept in much less than 6 $\mu$sec, depending upon the rotational speed of the wheel and the rate of change of the radius of the wheel. The dynamic tilt, which is cancelled by the flip, is $\pm 0.25$ mrad per wheel reflection. The dynamic focus amounts to $\pm 1/25$ wavelength per reflection for a 2 mm diameter beam, which gives a dynamic intracavity distortion of $\pm 1/12$ wavelength. Some frequency modulated radar systems require unidirectional chirps while others require both up-chirps and down-chirps. As previously described, the present invention is uniquely designed for unidirectional chirps, which, for electro-optic modulators, require very fast reset times on the order of 10 nsec to bring the ramp voltage back down from 1600 volts to zero. However, in situations that require bidirectional chirps, it is not always necessary that the up-chirps and down-chirps alternate on a chirp-by-chirp basis. It is often acceptable to alternate a sequence of up-chirps with a sequence of down-chirps as long as the alternation frequency is fast enough, such as 5 msec of up-chirps followed by 5 msec of down-chirps, with 0.1 msec in between for switching.

Similar to the bidirectional chirp systems described previously for the phase plate, such an alternation method could be accomplished by using two counter-rotating wheels, one inside the other, with slots in the rim for the outer wheel. The distortions would be the same for both wheels and in the same direction, so that one corrector plate would compensate for both sets of distortions. Another method of alternating the chirp direction is to make one wheel with both increasing and decreasing radius sections. Here allowance must be made for the tilt deviation of the two sections if the tilt-eliminating double bounce and flip configuration discussed previously is not used. Using the 10 cm wheel example given above, the radius increases by 2 mm in one-half of the 32 cm circumference of the wheel, the physical wedge angle is 12.5 mrad, the optical deviation is 25 mrad, and the difference between the deviations of the up-chirp and the down-chirp beams is 50 mrad. If an additional resonator length can be tolerated, these beams can just be allowed to propagate until they are physically separated, and then one end mirror (or diffraction grating) can be supplied for each. For a waveguide laser with a 2 mm diameter beam, they will separate in 4 cm. If higher than focus corrections are required, the correction plates required by the two beams would be different, and so they would have to be put in the separated portions of the beam paths.

Figure 19:
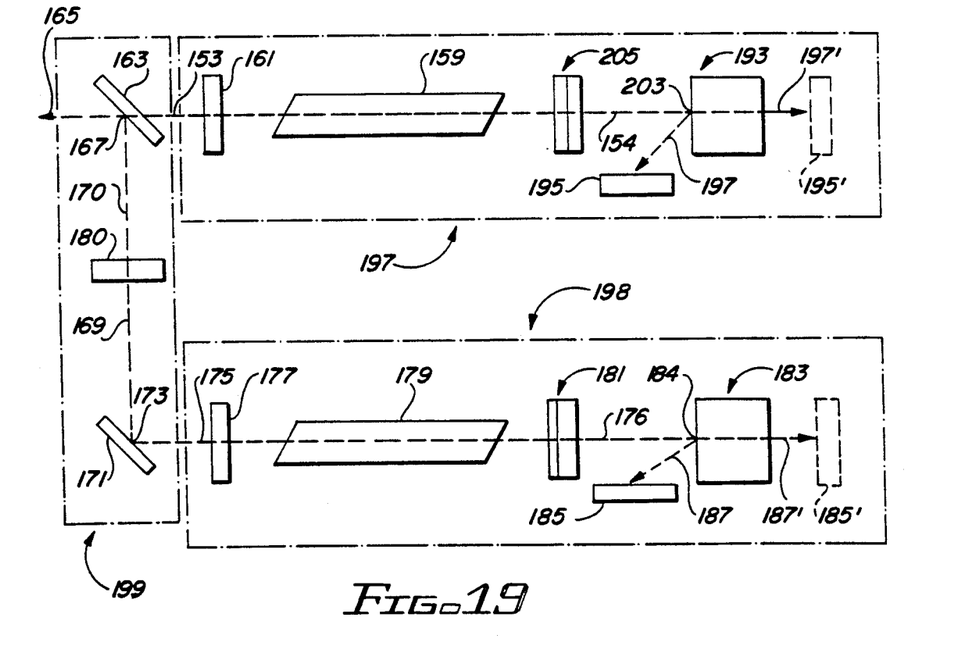
FIG. 19 is a system for simultaneously producing both up-chirps and down-chirps using the concept of the present invention.

If up-chirps and down-chirps must be within one chirp period of each other, the two-laser system shown in FIG. 19 can be used, in which two outputs with orthogonal polarizations are combined by a polarizing beam splitter. This system will transmit both chirps simultaneously.

In FIG. 19, a first laser system 197 having either a phase plate or a spiral wheel used in either a reflective or a transmissive mode for producing an up-chirp or down-chirp signal, and a second laser system 198 having either a phase plate or a spiral wheel used in either a reflective or a transmissive mode for producing the other of an up-chirp or a down-chirp signal, have their outputs combined by output optical means 199 including a mirror, a halfwave plate, and a polarizing beam splitter combination.

FIG. 19 includes a first block 193, which may represent either a rotating spiral wheel 65 or a helical phase plate wheel 21 having a shaft defining an axis of rotation. The outer peripheral edge surface of the wheel may be a mirror if block 193 is a spiral wheel 65, and the face may be reflective or transmissive if block 193 is a helical phase plate 21. A laser 159 outputs a laser beam 153 which passes through the output mirror 161 and through a polarization beam splitter 163 to become part of the combined output beam 165. The laser beam 153, which is within the resonant cavity and within the optical path of laser 159, passes through a corrector plate or lens 205 and is reflected off of the mirror surface of the spiral wheel 193 or the reflective phase plate 21 from whence it is reflected as beam 197 to the end-optic 195, which may be either a mirror or a diffraction grating. If the block 193 is a transmissive phase plate 21, the beam 153 will pass therethrough as transmitted beam 197' to impinge on the end optic 195'.

Similarly, the second block 183 may include either the phase plate 21 or the spiral wheel 65. The beam 175 is generated by the second laser 179 and passed through an output mirror 177. The beam 175 also passes through the corrective optic 181 as beam 176 and impinges off of the mirror surface of block 183, if it represents either the phase plate 21 or the spiral wheel 65 in a reflective mode. Reflected beam 187 then impinges on the end-optic device 185. If block 183 represents either a phase plate 21 or a spiral wheel 65 in a transmissive mode, then the impinging beam 176 passes therethrough as transmitted beam 187' to impinge on the end optic device 185'. The output beam 175 is then impinged onto a mirror 171 and reflected from the point of incidence 173 as reflected beam 169 to pass through a halfwave plate 180, which rotates the plane of polarization of the beam 169 by 90 degrees. Beam 169 continues through phase plate 180 as the phase-shifted beam 170 to impinge at point 167 on the surface of the polarized beam splitter 163, wherefrom it is reflected to become part of the combined output beam 165.

The halfwave plate 180 can be eliminated by folding the path of beam 169, 175 out of plane to rotate the plane of polarization or by rotating one of the lasers 159 or 179 by 90 degrees on its axis to generate the orthogonal polarization. The method and system of FIG. 19 could use two phase plate wheels, two spiral wheels, or one of each; and either the phase wheel or the spiral wheel could be used in either the reflective or transmissive mode.

The chirp linearity of this invention depends on the uniformity of the speed of rotation of the plate or wheel during one chirp. It would be very difficult to make a rotating device that was not highly uniform in rotational speed over such short times. For example, consider a 10 cm diameter wheel that has a mass of only 40 grams and is rotating at 110 Hz. To change the rotational speed by 1% during a 3 $\mu$sec chirp time would require a torque of 9 nt-m (5 ft/lb). Considering that the motor necessary to drive this device has a torque of only 1/100 of this amount, rotational uniformity during a chirp can be better than one part in one million.

Another non-linearity mechanism is mode-pulling. The laser does not lase exactly at the frequency of the cavity longitudinal mode but is pulled slightly toward the center of the gain line. How much it is pulled depends on the "Q" of the laser cavity, the frequency of the gain transition, the linewidth of the gain transition, and the tuning of the cavity resonance off of the center of the gain line. The majority of the mode pulling is proportional to the tuning of the cavity mode from the gain line center and so does not give rise to a chirp non-linearity. A calculation of the mode-pulling for a $CO_2$ laser at 10.6 $\mu$m with a 20 cm laser cavity, a 20% combined loss and output coupling (which gives a Q of 100,000), a gain linewidth of $\frac{1}{2}$ GHz, and a tuning over a 1 GHz FSR gives a deviation from linearity of one part in 200,000.

The chirp slope repeatability requirement depends on the radar signal detection and processing techniques—some schemes requiring long term repeatability, while others require repeatability only over times up to 10 $\mu$sec, or a few chirps. Chirp repeatability will depend on the uniformity of the average wheel wedge over the illuminated spot size. This can be held to better than 0.01% around the entire wheel, and several orders of magnitude better than that over a few chirps. Repeatability also depends on the uniformity of the speed of rotation of the wheel during a revolution and over many revolutions, which can be held below 0.01% long term and several orders of magnitude better than that over a few chirps. Thermal expansion of the wheel thickness and the temperature dependence of the index of refraction will limit long term repeatability, but the temperature dependencies are small. For example, thermal expansion of germanium is $5.7 \times 10^{-6}/°$ C. and the thermal change of the index of refraction is $2.8 \times 10^{-4}/°$ C.

Some radar schemes require chirp-to-chirp coherence; that is, the optical phase is synchronized from one chirp to the next. The seed injection described above starts each chirp up in phase with the seed laser, so it provides chirp-to-chirp coherence, even if it is not needed for rapid, initiation of the chirp for short chirp durations.

In summary, therefore, the systems, methods, and apparatus of the present invention relate to systems, methods, and apparatus for frequency modulating laser transmitters by repetitively linearly increasing or decreasing frequency with time to produce a frequency chirp as required in many radar applications. The present invention discloses a simple and easy way of generating such chirps. A first embodiment of the present invention utilizes the face of a rotating wheel. The thickness of a wedge or ramp on the face varies angularly on the wheel and includes either a mirror, in a reflective mode, or a transmission media, in a transmissive mode. The wheel is operably disposed inside the laser resonator so that the rotation of the wheel changes the optical pathlength of the resonator and causes the longitudinal modes of the resonator to tune. Similarly, in the second embodiment of the present invention, the rim of a spiral wheel with a spirally increasing (or decreasing) radius is used as a mirror inside of the laser resonator. The rotation of the wheel again changes the optical pathlength of the resonator and causes the longitudinal modes of the resonator to tune, thereby producing the required chirps. Various systems are shown for producing up-chirps or down-chirps, either alone or simultaneously; and still other systems are described in detail along with specific examples to show the advantages of the present system over the systems of the prior art.

It will be understood by those skilled in the art that various modifications, changes, variations, substitutions, and alterations can be made in the systems, methods, and apparatus of the present invention without departing from the spirit and scope thereof, which is limited only by the appended claims.

What is claimed is:

1. An improved frequency-modulated laser radar transmitter system having a laser for generating an output beam, said laser having a resonant cavity, an optical path, and an optical beam circulating along said optical path within said cavity, the frequency of said optical beam being determined by the optical length of said cavity, the improvement comprising:

a wheel having a pair of opposite face surfaces and an outer peripheral rim surface, said wheel being disposed in said optical path within said resonant cavity;

a wedge of optical material disposed in a layer of at least one of a repetitively linearly increasing and a repetitively linearly decreasing thickness with respect to angular position on a surface of said wheel;

means for rotating said wheel, and means of impinging said optical beam onto said wedge of optical material within said resonant cavity for linearly varying the length of said cavity with time to linearly chirp the frequency of the laser, and said one face of said wheel includes at least two cycles of said optical wedge for mechanical dynamic balancing such that a smooth linear chirp is achieved.

2. An improved frequency-modulated laser radar transmitter system having a laser for generating an output beam, said laser having a resonant cavity, an optical path, and an optical beam circulating along said optical path within said cavity, the frequency of said optical beam being determined by the optical length of said cavity, the improvement comprising:

a wheel having a pair of opposite face surfaces and an outer peripheral rim surface, said wheel being disposed in said optical path within said resonant cavity;

a wedge of optical material disposed in a layer of at least one of a repetitively linearly increasing and a repetitively linearly decreasing thickness with respect to angular position on a surface of said wheel;

means for rotating said wheel, and means of impinging said optical beam onto said wedge of optical material within said resonant cavity for linearly varying the length of said cavity with time for linearly chirping the frequency of the laser, wherein said optical wedge includes an optically transmissive material such that the impinging optical beam passes through the optically transmissive material, and has its optical path linearly changed with time as the thickness of said optically transmissive material varies with time as said wheel is rotated, for causing the frequency of said laser to chirp; and further including a fixed corrector plate means disposed in the optical path of the resonant cavity for eliminating distortion from the transmitter system.

3. A method of frequency modulating a radar transmitter with at least one of a repetitive linear increase and a repetitive linear decrease in frequency with time, comprising the steps of:

providing a laser having a resonant cavity and an optical path; and rotating a reflective helical phase plate disposed in said optical path within said resonant cavity to linearly increase or decrease the optical length thereof and hence cause the longitudinal modes of said resonant cavity to linearly and repetitively tune over one free spectral range.

4. A method of generating at least one of a repetitively linearly increasing and a repetitively linearly decreasing laser frequency comprising:

providing a wheel;

disposing a phase plate of optically reflective material on one of the faces of said wheel, the thickness of said phase plate increasing or decreasing linearly with the angular location around the wheel;

orienting the wheel so that the phase plate is disposed within the optical resonator of a laser;

rotating the wheel; and reflecting the optical beam within said resonator from said phase plate for changing the length of the resonator's optical path, thereby tuning the longitudinal modes of the resonator and hence the operating frequency of the laser linearly and repetitively over one free spectral range.

5. A method of generating a frequency modulated laser signal having at least one of a repetitively linearly increasing and a repetitively linearly decreasing frequency with time, comprising:

providing a laser having a resonant cavity;

placing a wheel within the laser's resonant cavity;

disposing at least one of a repetitively linearly increasing and a repetitively linearly decreasing ramp of optically reflective material on the outer peripheral edge of the wheel such that said wheel has a spirally varying radius;

rotating said wheel; and reflecting the laser's optical beam off of the optically reflective material for varying the optical pathlength of the resonant cavity and causing the longitudinal modes of the resonator to tune and chirp the laser's operating frequency.

6. A method of generating at least one of a repetitively linearly increasing and a repetitively linearly decreasing laser frequency comprising:

providing a laser having a resonant cavity;

disposing a wheel within the resonant cavity;

disposing a ramp of optically reflective material and having at least one of a spirally increasing and a spirally decreasing radius on the outer peripheral rim of the wheel;

rotating the wheel; and reflecting the optical beam from the ramp on the outer peripheral rim of the rotating wheel for changing the optical pathlength within the resonant cavity, thereby tuning the longitudinal modes of the resonant cavity and repeatedly shifting the frequency of the laser with time over one free spectral range.

7. A laser system for simultaneously generating both an up-chirp signal and a down-chirp signal comprising:

a first laser for emitting a first output beam, said first laser having a first resonant cavity including a first optical path and a first optical beam circulating within said first resonant cavity;

a first optical output mirror in said first optical path for outputting the first output beam;

a first wheel having an outer peripheral rim portion including at least one ramp of optical material, said ramp having at least one of a radially linearly increasing and a radially linearly decreasing radius with the angle about the wheel;

a first mirror surface operably disposed on the exterior surface of said ramp;

means for rotating said first wheel;

said first wheel being operably disposed within the optical path of the first resonator such that the first optical beam impinges on and is reflected from the mirror surface of the first rotating wheel such that as the thickness of the ramp and hence the radius of the first wheel changes the optical path of the resonator, the frequency changes linearly and repetitively with time to produce one of said up-chirp and down-chirp signals;

a polarizing beam splitter means operably disposed at the output of said first laser for transmitting the emitted beam from said first laser;

a second laser for emitting a second output beam, said second laser having a second resonant cavity including a second optical path and a second optical beam circulating within said second resonant cavity; a second optical output mirror in said second optical path for outputting the second output beam;

a second wheel having an outer peripheral rim portion including at least one ramp of optical material, said ramp having at least one of a radially decreasing and a radially increasing radius with the angle about the wheel;

a second mirror surface operably disposed on the exterior surface of said ramp;

means for rotating said second wheel;

said second wheel being operably disposed within the optical path of said second resonator such that the second optical beam impinges on and is deflected from the mirror surface of the second rotating wheel such that as the thickness of the ramp and hence the radius of the second wheel changes the optical path of the second resonator, the frequency changes linearly and repetitively with time to produce the other of said up-chirp and down-chirp signals;

the first output beam of said first laser having a first polarization and including said up-chirp signal while the second output beam of said second laser has a polarization orthogonal to the first polarization and includes said down-chirp signal;

mirror means operably disposed for reflecting the down-chirp signal presented by the second output beam onto said polarization beam splitter means for combining the first and second output beams to thereby simultaneously output both the up-chirp signal and the down-chirp signal.

8. The laser system of claim 7 further including a halfwave plate means disposed in the optical path between said mirror means and said polarization beam splitter means for orthogonally orienting of polarization of the two output beams.

9. The laser system of claim 7 further including first and second cylindrical lens correction means disposed in the optical paths of the first and second lasers, respectively, for eliminating distortions due to the fact that the spirals of the ramps do not have constant radii of curvature.

10. A system for simultaneously generating both an up-chirp signal and a down-chirp signal comprising:
(A) a first laser system including:
(1) A first laser for generating a beam of energy;
(2) said first laser including:
(a) a first resonant cavity;
(b) a first optical path;
(c) a first laser output;
(d) a first optical device operatively disposed in said end-position of said first optical path;
(3) a first wheel having at least one of a face surface and a peripheral rim surface, said wheel being operatively disposed within said optical
(4) means for rotating said wheel for presenting different portions of a particular one of said surfaces to said beam;
(5) said particular one of said surfaces having an optical thickness that varies linearly and repetitively with time as said wheel rotated to vary the first optical pathlength and hence the frequency of the resonator Cavity thereby generating at least one of said up-chirp signal and said down-chirp signal;
(6) said first laser output passing said generated signal;
(B) a second laser system substantially identical to said first laser system, said second laser having a second laser output for generating the other of said up-chirp signal and said down-chirp signal; and
(C) means operatively coupling said first and second laser outputs for rotating the polarization of one of said signals orthogonal to the other, combining the signals, and outputting said up-chirp signal and said down-chirp signal simultaneously from one of said laser outputs.

11. The system of claim 10 wherein said at least one of a face surface and a rim surface includes said face surface, said face surface including a helical wedge of optical material means for continuously, linearly and repetitively varying the optical pathlength of the beam impinging thereon with time as said wheel is rotated.

12. The system of claim 11 wherein said helical wedge of optical material means includes an optically transmissive material, said impinging optical beam path passing through said transmissive material, the optical pathlength therethrough being repetitively and linearly varied with time as the wheel rotates and a thickness of said helical wedge varies therewith.

13. An improved frequency-modulated laser radar transmitter system having a laser for generating and emitting an output beam, said laser having a resonant cavity, an optical path, and an optical beam circulating along said optical path within said resonant cavity, the improvement comprising:

a wheel having a pair of opposite face surfaces and an outer peripheral surface;

one surface of wheel being formed as a reflective optical wedge and disposed in said optical path to reflect said optical beam within said resonant cavity;

means for rotating said wheel;

said reflective optical wedge acting to linearly increase or decrease the optical length of said resonant cavity as said wheel is rotated to thereby cause the longitudinal modes of said resonant cavity to linearly and repetitively tune over one free spectral range.

14. The improved laser radar transmitter of claim 13 wherein said surface of said wheel that is formed as a reflective optical wedge is said outer peripheral surface; said outer peripheral surface being reflective and having a spirally increasing or decreasing radius.

15. The improved laser radar transmitter system of claim 14 further comprising a cylindrical lens disposed in said optical path within said resonant cavity for compensating for defocus introduced into the circulating optical beam by the reflective optical wedge.

16. The improved laser radar transmitter system of claim 15 further comprising a corrector plate for compensating for higher order distortions introduced into the circulating optical beam by the reflective optical wedge.

17. The improved laser radar transmitter system of claim 13 further including a beam flipping configuration having two reflective plates disposed in said optical path within said optical cavity adjacent said optical wedge for twice reflecting said optical beam back onto said reflective optical wedge.

18. The improved laser radar transmitter of claim 13 wherein the surface of said wheel that is formed as a reflective optical wedge is one of said face surfaces;

said one face surface being reflective and having a helically increasing or decreasing height.

19. The improved laser radar transmitter system of claim 18 further comprising a corrector plate for compensating for higher order distortions introduced into the circulating optical beam by the reflective optical wedge.

* * * * *